United States Patent [19]

Nagaishi

[11] 4,386,520
[45] Jun. 7, 1983

[54] FLOW RATE MEASURING APPARATUS

[75] Inventor: Hatsuo Nagaishi, Yokosuka, Japan

[73] Assignee: Nissan Motor Company, Limited, Yokohama, Japan

[21] Appl. No.: 223,146

[22] Filed: Jan. 7, 1981

[30] Foreign Application Priority Data

Jan. 10, 1980 [JP] Japan ................................. 55-1644

[51] Int. Cl.$^3$ ............................................. G01F 1/32
[52] U.S. Cl. ...................................... 73/118; 73/197; 73/861.22
[58] Field of Search ..................... 73/861.22, 197, 195, 73/118

[56] References Cited

U.S. PATENT DOCUMENTS

| | | | |
|---|---|---|---|
| 3,871,214 | 3/1975 | Masaki et al. ................... | 73/195 X |
| 4,142,407 | 3/1979 | Kuroiwa et al. ............. | 73/861.22 X |
| 4,201,084 | 5/1980 | Ito et al. ............................ | 73/861.22 |
| 4,311,042 | 1/1982 | Hosoya et al. .................... | 73/204 X |
| 4,320,650 | 3/1982 | Kita .................................. | 73/204 X |

*Primary Examiner*—Charles A. Ruehl
*Attorney, Agent, or Firm*—Schwartz, Jeffery, Schwaab, Mack, Blumenthal & Koch

[57] ABSTRACT

A change in the amplitude of the output of a vortex sensor is sensed. When the change exceeds a predetermined value in the region of high engine load, the coefficient of smoothing applied to the output of the vortex sensor is switched to another value, or alternatively the intake air flow rate based on the engine speed is used, thereby providing a value for the flow rate of the intake air having excellent accuracy over the whole range of engine load.

4 Claims, 5 Drawing Figures

FLOW RATE MEASURING APPARATUS

BACKGROUND OF THE INVENTION

1. Field of the Invention

The present invention relates to an internal combustion engine, and more particularly to apparatus for measuring the flow rate of the intake air into the internal combustion engine.

2. Description of the Prior Art

An electronically controlled fuel injection system used with an internal combustion engine senses the flow rate of intake air into the engine to generate a signal representing the flow rate and injects fuel into the intake passageway through an electromagnetic valve so that a predetermined air-fuel ratio is supplied based on the signal. In order accurately to control the air-fuel ratio, which seriously affects fuel economy and exhaust performance of the engine, it is necessary to measure the flow rate of the intake air into the engine.

Recently, attention has been drawn to a commercially available Karman vortex flow meter, which can serve as an intake air flow meter. A pillar member is arranged in the intake air passageway to generate an array of vortices downstream of the pillar member, and the sensor electrically detects the frequency of occurrence of the vortices, which is proportional to the flow velocity of the intake air. This flow meter is simple in structure, highly reliable in operation, and inexpensive, but is affected greatly by intake pulsations occurring during high load engine operation when the throttle valve is fully opened to result in a disturbance in the Karman vortex array, thereby involving a relatively large error in the measurement during high load engine operation. That is, this flow meter outputs a pulse signal corresponding to the frequency of Karman vortices created in the intake air, which pulse signal is averaged by an integrating circuit to produce an analog voltage signal representing the flow rate of the intake air. If certain of the vortices in the vortex array fail to form, corresponding pulses will be missing from the shaped pulse signal with the result that the resulting smoothed voltage signal does not correspond to the actual flow rate of the intake air. If this occurs, the use of an averaging circuit having a relatively large smoothing coefficient and for smoothing the shaped signal will prevent rapid changes in the output, but lower the response speed of the averaging circuit during partial engine load. Thus during a transient interval such as when the intake air into the engine fluctuates, the error involved in the measurement would increase.

Another prior art flow meter has been proposed which determines the operational state of an internal combustion engine, using a sensor such as an intake vacuum switch, a throttle switch and so forth to produce a signal representing the operational state, and switches to a different smoothing coefficient in the region of high load engine operation, in response to the signal. However, the use of the throttle switch, intake vacuum switch and so forth makes the flow meter expensive, makes the intake passage structure complicated, and makes the flow meter less reliable.

SUMMARY OF THE INVENTION

The present invention provides a flow rate measuring apparatus for an internal combustion engine which includes a flow sensing means for measuring the flow of the intake air into the engine to generate a first signal representing the flow of the intake air into the engine with relatively high accuracy when the engine is under partial load. Change detecting means responds to the first signal from the first sensing means for generating a second signal when a change in the amplitude of the first signal is greater than a predetermined value. When the engine is under substantially full load, flow signal generating means produces a third signal representing the flow of the intake air into the engine with relatively high accuracy when the engine is under substantially full load. Selecting means responds to the second signal from the change sensing means so as to provide as an output the first signal from the flow sensing means when the engine is under substantially partial load and the third signal from the flow signal generating means when the engine is under substantially full load. Thus the apparatus provides a flow rate of the intake air into the engine, representing the actual flow rate of the intake air with high accuracy over the whole range of engine load.

BRIEF DESCRIPTION OF THE DRAWINGS

Other objects, features and advantages of the present invention will be apparent from the following description thereof taken in conjunction with the accompanying drawings throughout which the same reference numerals and characters designate corresponding elements and in which.

DETAILED DESCRIPTION OF THE PREFERRED EMBODIMENTS

Figure 1:
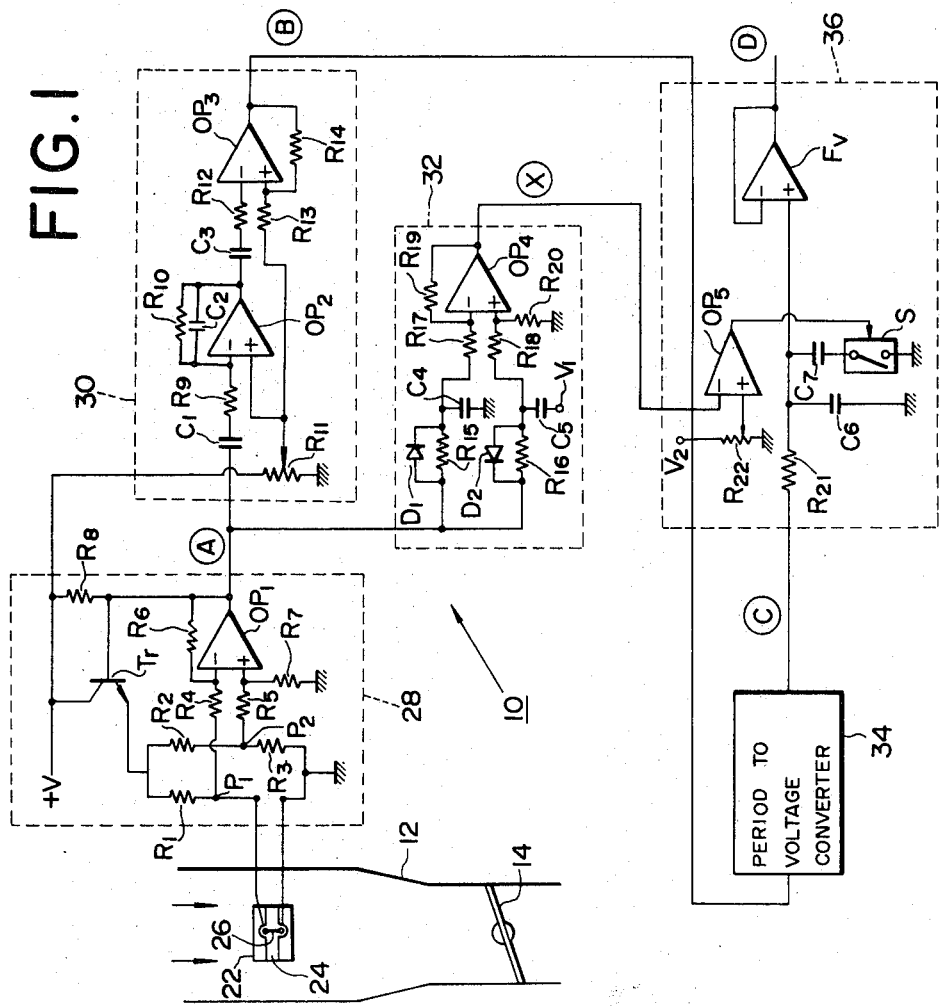
FIG. 1 is a circuit diagram of a preferred embodiment of an intake air flow measuring apparatus according to the present invention.

Referring to FIG. 1, there is shown a preferred embodiment of a flow measuring apparatus according to the present invention, generally designated by reference numeral 10, associated with an intake air passage 12 to an internal combustion engine, not shown. The measuring apparatus includes a vortex generator 22 in the form of a pillar disposed upstream of a throttle valve 14. The generator 22 has therein a through passage 24 with a hot wire probe 26 crossing the passage and arranged in the intake air such that the axis of the through passage 24 is perpendicular to the normal direction of flow of the intake air. An array of Karman vortices occurs at each open end of the through passage 24 and flows away. This produces pressure fluctuations in the passage and hence alternating current of intake air flowing therethrough in opposite directions, thereby cooling the hot wire probe 26.

A hot wire vortex sensor 28 includes a bridge circuit of resistors $R_1$, $R_2$, $R_3$ and the hot wire probe 26, an amplifying circuit including an operational amplifier $OP_1$ and resistors $R_4$, $R_5$, $R_6$, $R_7$ for amplifying the difference voltage between points $P_1$ and $P_2$, an NPN transistor Tr whose base potential is supplied through a resistor $R_8$ from a power supply $+V$. The transistor Tr controls the magnitude of the voltage applied across the bridge from the power supply $+V$.

A wave shaper 30 shapes the output of the hot wire vortex sensor 28 to a square pulse form by cutting away portions higher and lower than predetermined high and low levels, respectively. The wave shaper 30 includes an amplifying circuit comprising capacitors $C_1$ and $C_2$, resistors $R_9$ and $R_{10}$, an operational amplifier $OP_2$, and a reference level setting resistor $R_{11}$, and a comparator formed from a capacitor $C_3$, resistors $R_{12}$, $R_{13}$, $R_{14}$ and an operational amplifier $OP_3$.

A change detecting circuit 32 senses the difference between the maximum amplitude and the minimum amplitude of the output of the vortex sensor 28. The change detecting circuit 32 includes a maximum value hold circuit portion including a diode $D_1$, a resistor $R_{15}$ and a capacitor $C_4$, a minimum value hold circuit including a diode $D_2$, a resistor $R_{16}$, and a capacitor $C_5$ to which a predetermined reference voltage $V_1$ is applied, and an amplifying circuit formed from resistors $R_{17}$, $R_{18}$, $R_{19}$, $R_{20}$ and an operational amplifier $OP_4$. When the output of the vortex sensor 28 is relatively high, the capacitor $C_4$ charges through the diode $D_1$ whereas when the output of the sensor 28 is low compared with the voltage charged on the capacitor $C_4$, this capacitor discharges slowly through the resistor $R_{15}$ to the sensor 28 so that the circuit formed of the diode $D_1$, the resistor $R_{15}$ and the capacitor $C_4$ serves as a maximum value hold circuit. When the output of the sensing circuit 28 is relatively low, the capacitor $C_5$ charges through the resistor $D_2$, whereas when the output of the sensor 28 is high compared with the charged voltage of the capacitor $C_5$, this capacitor $C_5$ discharges slowly through the resistor $R_{16}$ to the circuit 28, so that the circuit formed by the diode $D_2$, the resistor $R_{16}$ and the capacitor $C_5$ serves as a minimum value hold circuit. The differential amplifying circuit including the operational amplifier $OP_4$ amplifies the difference between the voltages of the capacitors $C_4$ and $C_5$.

A period to voltage converter 34 converts the pulse period output of the wave shaper 30 to an analog voltage signal corresponding to the frequency of the pulse output. For example, the converter may include a clock pulse generator which generates clock pulses having a period of, for example 1 $\mu$s, which is very short compared with the period of the vortices generated, a voltage accumulator whose output repeatedly increases by a predetermined voltage increment from zero each time a clock pulse is inputted thereto during the presence of a pulse from the wave shaper 30 to produce the accumulated voltage at the beginning of the next pulse coming from the wave shaper to the accumulator, and a hold circuit retaining the output of the accumulator during the next pulse. Thus, the converter 34 generates an analog voltage proportional to the period of the vortices sensed.

The output of the converter 34 is smoothed by an averaging circuit 36 which includes a smoothing circuit formed by a resistor $R_{21}$, and capacitors $C_6$, $C_7$, a comparator $OP_5$ which receives a first reference input through a resistor $R_{22}$ from a power supply $V_2$ and a second input from change detecting circuit 32 so as to go high when the output of the change detecting circuit 32 is above a predetermined value, an analog switch S which connects the capacitor $C_7$ in parallel with the capacitor $C_6$ of the smoothing circuit when the output of the change detecting circuit 32 is higher than the first reference input and hence the output of comparator $OP_5$ is high, and a voltage follower $F_v$ which receives and outputs the output of the smoothing circuit.

In operation, if the hot wire probe 26 of the vortex generator 22 is cooled by the intake air flowing the through passage 24 due to the occurrence of vortices when the bridge circuit balances, the resistance of the probe 26 decreases and thus the voltage level at $P_1$ of the bridge circuit of the vortex sensor 28 lowers compared with the voltage level at $P_2$ with the result that the bridge circuit is unbalanced. This causes the voltage level at the inverting input terminal of the operational amplifier $OP_1$ to lower, thereby increasing the output of the operational amplifier $OP_1$, and the voltage applied across the bridge circuit through the transistor Tr. As a result, the voltage applied across the probe 26 increases to heat the same. This increases the resistance of the probe, and hence the voltage level at $P_1$ and, on the other hand, decreases the output of the operational amplifier $OP_1$, thereby maintaining the resistance of the probe 26 at substantially constant value through the transistor Tr.

Figure 2:
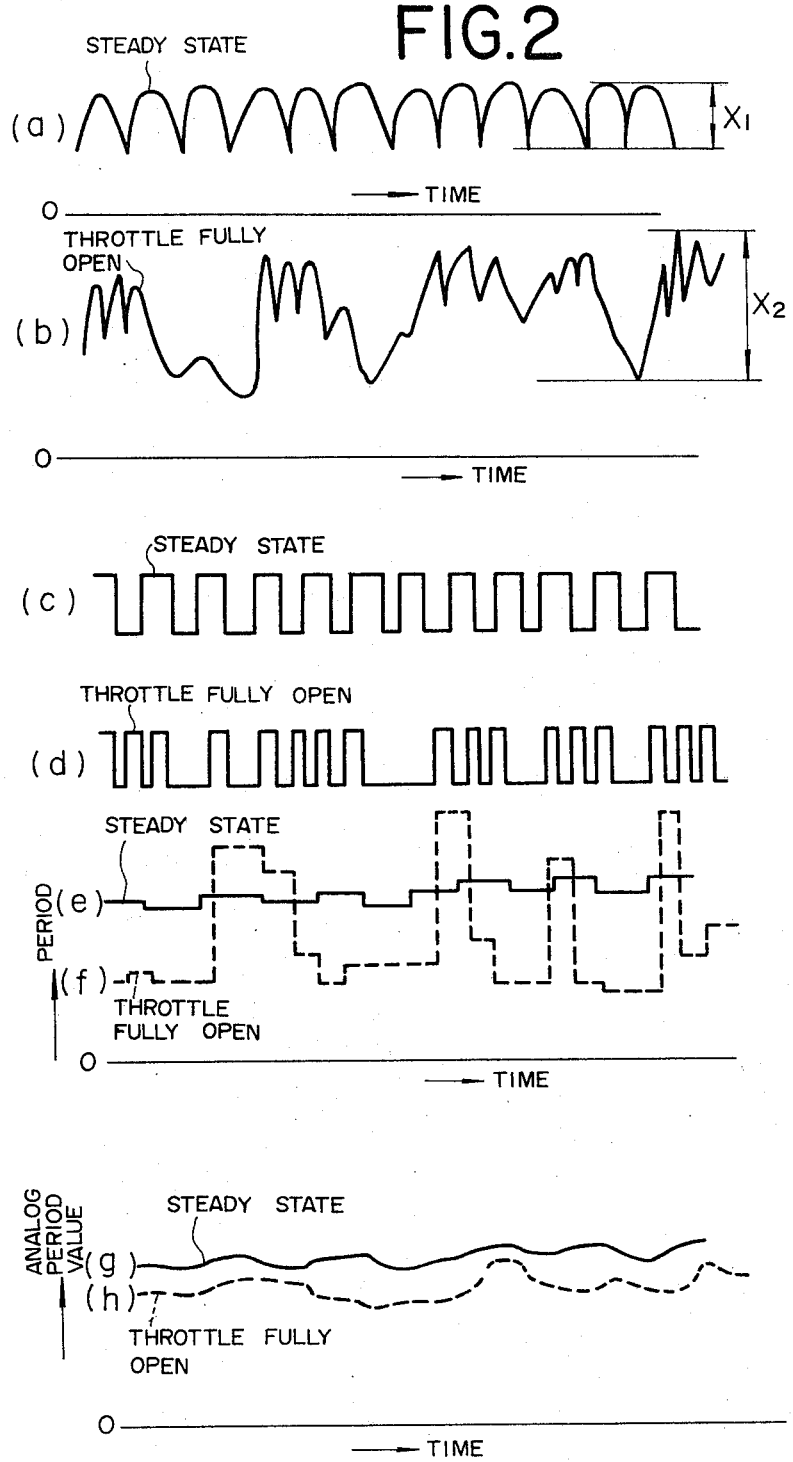
FIG. 2 is a waveform chart of the various elements of the apparatus of FIG. 2.
Figure 3:
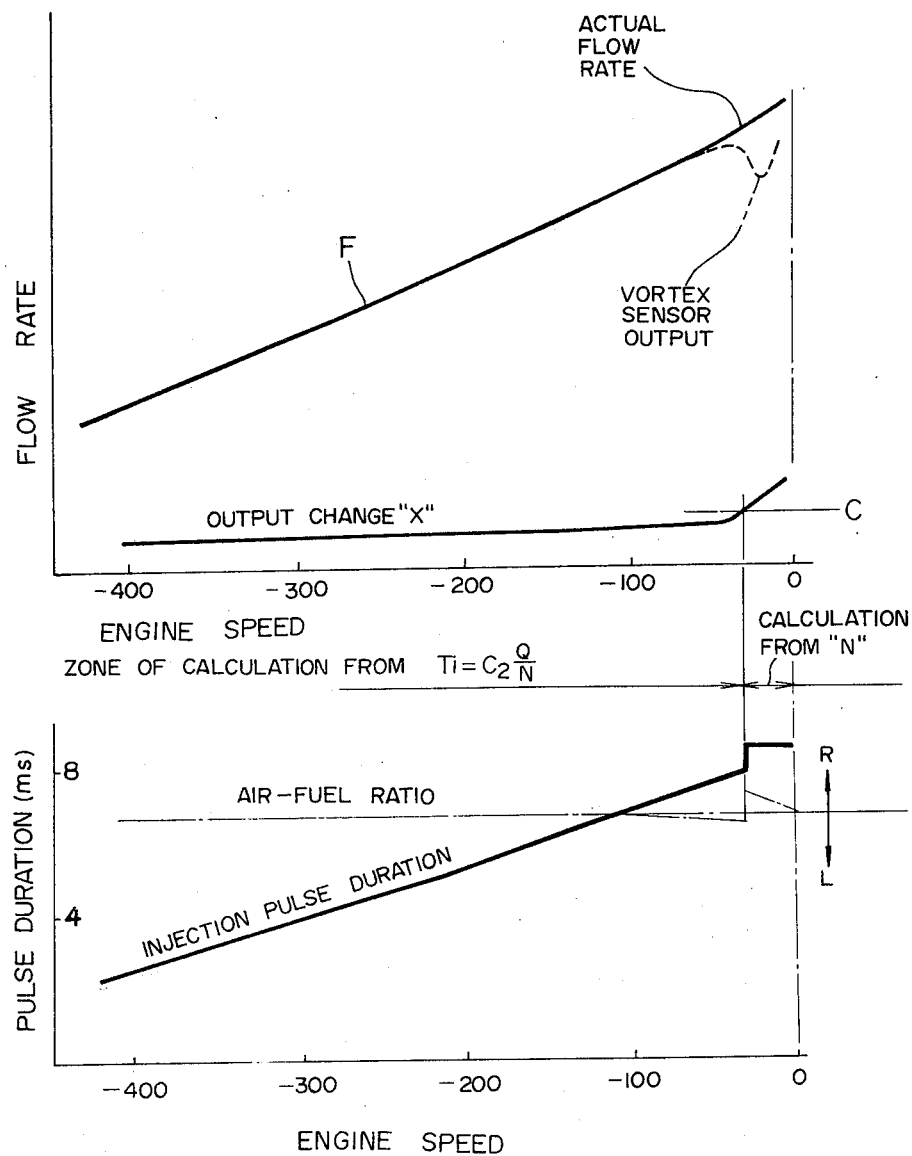
FIG. 3 is a graphical illustration showing the actual flow rate of the intake air into the engine, the vortex sensor output, output change, fuel-air ratio and fuel injection pulse width, plotted against the engine speed.

The vortex detecting circuit 28 produces an output having a substantially regularly varying amplitude with a relatively small change $X_1$, as shown by (a) in FIG. 2, when the engine is under partial load because pulsations in the flow of the intake air occurring due to air intake operations of the engine cylinders are relatively small. The shaped output from the wave shaper 30 has a relatively regular pulse frequency, as shown by (c) in FIG. 2, and the output from the period to voltage converter 34 is substantially flat, as shown by (e) in FIG. 2. Thus the output of the averaging circuit 36 during partial engine load represents the actual flow rate of the intake air, as shown by (g) in FIG. 2 with respect to time and also as shown by F in FIG. 3 with respect to engine speed. The change in the output of the change detecting circuit 32 with the engine speed during partial load is also shown by X in FIG. 3.

On the other hand, when the engine is under full load, pressure changes in the through passage 24 due to the intake pulsations are merged and additionally some Karman vortices are absent. Thus the frequency at which the probe 26 is cooled is not proportional to the flow rate of the intake air into the engine, and the degree of cooling of the probe 26 fluctuates. This increases the change $X_2$ in the amplitude of the detected signal from the circuit 28, as shown by (b) in FIG. 2, compared with that when the engine is under partial load. The shaped output from the wave shaper 30 has great unevenness of pulse frequency, as shown by (d) in FIG. 2. The corresponding analog voltage output from the period to voltage converter 34 fluctuates greatly and irregularly, as shown by (f) in FIG. 2.

When the change becomes greater than the difference $X_2$, i.e. the output from the change detecting circuit 32 exceeds the predetermined reference level at the noninverting input terminal of the comparator $OP_5$, the output of the comparator $OP_5$ goes high so that the analog switch S is turned on thereby connecting the capacitor $C_7$ in parallel with the capacitor $C_6$, i.e. increasing the smoothing coefficient, or integrating constant, of the averaging circuit 36. As a result, when the engine is under full load the averaging circuit 36 produces an output having a slow amplitude change, as shown by (h) in FIG. 2, similar to that when the engine is under partial load, and substantially equal to the actual flow rate.

That is, although there are irregularities in the period outputs of the period to voltage converter 34 due to failure of some of the vortices when the engine is under high load where the throttle valve is substantially completely open, the smoothing coefficient of the averaging circuit 36 is made larger by using a larger integrating constant so that the irregularities in the period are absorbed and hence the averaging circuit 36 provides an output corresponding to the actual flow rate. If the output of the averaging circuit 36 is used without adding the capacitor $C_7$ in parallel with the capacitor $C_6$, it would decrease as shown by the broken line in FIG. 3 thereby providing an incorrect flow rate value.

The output from the averaging circuit 36 is inputted into a fuel injection pulse duration calculation circuit, not shown, where the pulse duration for which fuel is injected into a corresponding engine cylinder is calculated by $Ti = C_2(Q/N)$ where $C_2$ is a constant, $Q$ is the measured flow rate of the intake air and $N$ is the engine speed at that time. The calculated pulse duration is adjusted based on the temperature of engine cooling water, the temperature of the intake air and the injection voltage level. A fuel injection valve drive pulse is then generated from a pulse generator, not shown.

Figure 4:
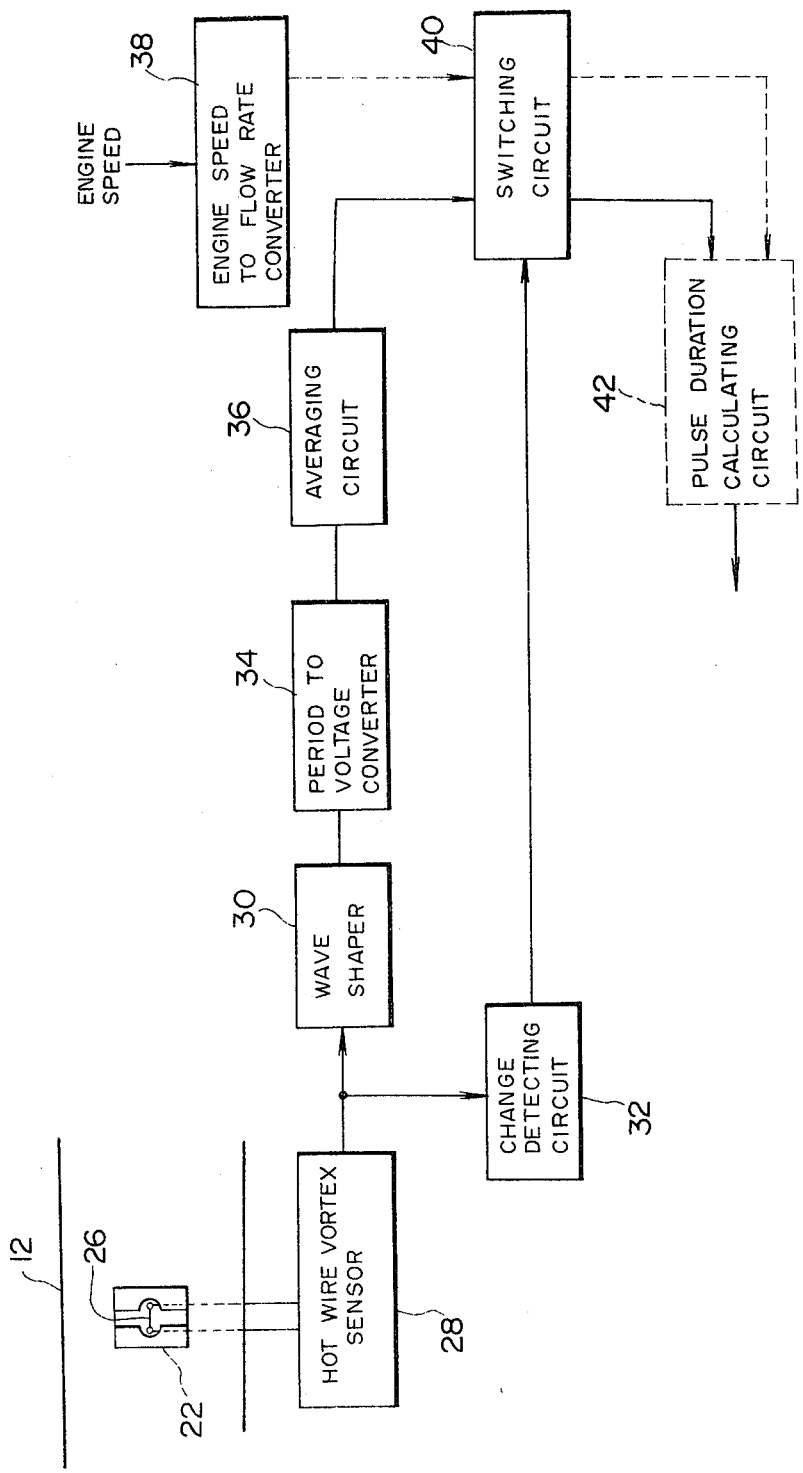
FIG. 4 is a block diagram of a modification of the present invention.

Referring to FIG. 4, there is shown a second embodiment of the present invention. This embodiment is the same as the first embodiment mentioned above except that the second embodiment has a speed to flow rate converter 38 which, when the engine is under substantially full load, converts the engine speed to a voltage representing the corresponding flow, and a switching circuit 40 which responds to the output signal from the change detecting circuit 32 to select either the output of the speed to flow rate converter 38 or the output of the averaging circuit 36. That is, when the engine is under partial load, the output of the averaging circuit 36, representing the flow rate obtained from the measurement of Karman vortices is selected by the switching circuit 40 whereas when the engine is under substantially full load, the output of the speed to flow rate converter 38 obtained from the measurement of the engine speed is selected. This is based on the fact that the flow rate of the intake air into the engine when the throttle valve 14 is substantially completely open and hence when the engine is under substantially full load is exactly proportional to the engine speed.

The pulse duration calculation circuit 42 based on the output from the switching circuit 40 calculates a time duration for which fuel is injected into each engine cylinder for each crankshaft rotation. This calculation can be carried out using a conventional standard digital microcomputer as follows. The output from the switching circuit 40 is converted to a corresponding digital data item. When the change X from the circuit 32 is not larger than the predetermined value $C_1$, the fuel injection pulse duration Ti is calculated from the above mentioned equation $Ti = C_2(Q/N)$.

Figure 5:
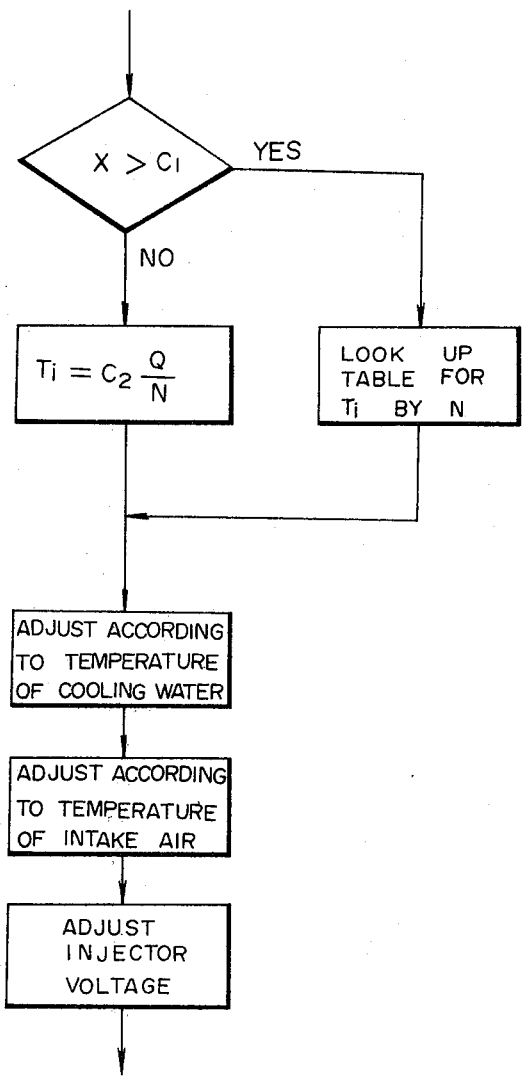
FIG. 5 is a flowchart for calculating a fuel injection pulse width based on the measured flow of intake air into the engine.

When X is greater than $C_1$, the pulse duration Ti is read from a stored look-up table where various engine speed data and the Ti data corresponding to the engine speed data are stored at corresponding addresses. Then the calculated pulse duration Ti is adjusted according to the temperature of the engine cooling water, the temperature of the intake air and the injection voltage level. This process is shown in FIG. 5. The resulting pulse duration and air-fuel ratio in terms of the engine speed are also in FIG. 3.

While the present invention has been described with respect to embodiments thereof, various changes and modifications could be made by those skilled in the art without departing from the spirit and scope of the present invention.

What is claimed is:

1. Apparatus for measuring the flow rate of intake air into an internal combustion engine, comprising:
   (a) flow sensing means for measuring the flow of the intake air into said engine to generate a first signal representing the flow of the intake air with relatively high accuracy when said engine is under partial load, said flow sensing means including a Karman vortex flowmeter which produces a flowmeter signal having a period proportional to the flow of the intake air, a wave shaper for shaping the flowmeter signal to pulse form, a circuit for converting the period of the flowmeter signal to a corresponding voltage signal, and an averaging circuit for smoothing the voltage signal with a suitable smoothing coefficient to generate said first signal;
   (b) change detecting means responsive to the first signal from said flow sensing means for generating a second signal when a change in the amplitude of the first signal is greater than a predetermined value;
   (c) flow signal generating means for producing a third signal representing the flow of the intake air into said engine with relatively high accuracy when said engine is under substantially full load, including means for sensing the engine speed to generate a speed signal representing the engine speed with relatively high accuracy, and converting said speed signal to produce said third signal; and
   (d) selecting means responsive to the second signal from said change sensing means for providing as an output the first signal from said flow sensing means when said engine is under substantially partial load and the third signal from said flow signal generating means when said engine is under substantially full load.

2. An apparatus for measuring the flow rate of intake air through an intake passage into an internal combustion engine, comprising:
   (a) means disposed in the intake passage of said internal combustion engine for generating Karman vortices whose frequency is substantially proportional to the flow of the intake air;
   (b) means for sensing the Karman vortices to generate a voltage signal indicative of changes in the pressure of the intake air due to the occurrence of the Karman vortices;
   (c) means for sensing the difference between the minimum value and the maximum value of the voltage signal;
   (d) means for comparing the sensed difference with a reference value to produce a comparison signal having a first value when the sensed difference is greater than the reference value and a second value when the sensed difference is less than the reference value; and
   (e) means responsive to the comparison signal for providing a first output signal in response to said second value and for providing a second output signal in response to said first value.

3. The apparatus of claim 2, wherein said means responsive to the comparison signal is connected to receive said voltage signal and includes means for shaping said voltage signal, and provides said shaped voltage signal as said first output signal and said means responsive to said comparison signal includes means for smoothing the shaped voltage signal in response to the comparison signal first value, and provides said smoothed voltage signal as the second output signal.

4. The apparatus of claim 2, wherein said means responsive to the comparison signal is connected to receive said voltage signal and includes means for shaping said voltage signal, and provides said shaped voltage signal as said first output signal, and including means for producing a signal indicative of engine speed, wherein said means responsive to the comparison signal is connected to receive said signal indicative of engine speed and provide said signal indicative of engine speed as the second output signal.

* * * * *